(12) United States Patent
Parchami et al.

(10) Patent No.: US 11,391,574 B2
(45) Date of Patent: Jul. 19, 2022

(54) OBJECT DETECTION

(71) Applicant: Ford Global Technologies, LLC, Dearborn, MI (US)

(72) Inventors: Mostafa Parchami, Dearborn, MI (US); Codrin Cionca, Ann Arbor, MI (US); Juan Enrique Castorena Martinez, Southfield, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 460 days.

(21) Appl. No.: 16/251,435

(22) Filed: Jan. 18, 2019

(65) Prior Publication Data
US 2020/0232799 A1 Jul. 23, 2020

(51) Int. Cl.
| | | |
|---|---|---|
| *G01S 7/48* | (2006.01) | |
| *G01C 21/30* | (2006.01) | |
| *G05D 1/02* | (2020.01) | |
| *G01C 21/28* | (2006.01) | |

(52) U.S. Cl.
CPC .............. *G01C 21/30* (2013.01); *G01C 21/28* (2013.01); *G01S 7/4802* (2013.01); *G05D 1/0231* (2013.01); *G05D 1/0276* (2013.01); *G05D 2201/0213* (2013.01)

(58) Field of Classification Search
CPC ........ G01C 21/30; G01C 21/28; G01C 21/20; G01S 7/4802; G01S 17/931; G01S 17/86; G01S 7/003; G01S 17/87; G01S 7/4808; G01S 17/89; G01S 17/93; G05D 1/0231; G05D 1/0276; G05D 2201/0213; G05D 1/0282

See application file for complete search history.

(56) References Cited

U.S. PATENT DOCUMENTS

| | | | |
|---|---|---|---|
| 7,969,558 B2 | 6/2011 | Hall | |
| 8,818,609 B1 | 8/2014 | Boyko et al. | |
| 9,329,269 B2 | 5/2016 | Zeng | |
| 9,697,606 B2 | 7/2017 | Stout et al. | |
| 2010/0013615 A1 | 1/2010 | Hebert et al. | |
| 2014/0118716 A1* | 5/2014 | Kaganovich | G06T 7/254 356/4.01 |
| 2017/0356993 A1* | 12/2017 | Lee | G01S 7/415 |
| 2018/0340781 A1* | 11/2018 | Doria | G06T 17/05 |
| 2020/0042801 A1* | 2/2020 | Auner | B60W 30/09 |

FOREIGN PATENT DOCUMENTS

| | | |
|---|---|---|
| WO | 2017157967 A1 | 9/2017 |
| WO | 2018071416 A1 | 4/2018 |

* cited by examiner

*Primary Examiner* — Sze-Hon Kong
*Assistant Examiner* — Daniel Tyler Reich
(74) *Attorney, Agent, or Firm* — Frank A. MacKenzie; Bejin Bieneman PLC

(57) ABSTRACT

A system includes a Lidar sensor and a processor. The processor is programmed to detect, using Lidar sensor data, a low-density area comprising a plurality of Lidar beam reflections less than a threshold, to determine dimensions of the area, and to determine that the area represents a physical object based on the detection and determination.

10 Claims, 11 Drawing Sheets

OBJECT DETECTION

BACKGROUND

One or more computers in an autonomous vehicle (or self-driving car) can be programmed to navigate the vehicle based on vehicle sensor data and map data. The vehicle computers may rely on object detection data, e.g., "point cloud" data generated from Lidar (Light detection and ranging) sensor data, to navigate the vehicle to a destination. However, current methods and technologies sometimes lack in detecting an object, e.g., when the object has a very smooth reflective surface and/or a dark color. Where a vehicle relies on object detection data for various operations, e.g., automatic braking, steering, and/or throttle control to avoid a collision with a detected object, a false detection can cause the vehicle to operate in a dangerous manner.

DETAILED DESCRIPTION

Introduction

Figure 1:
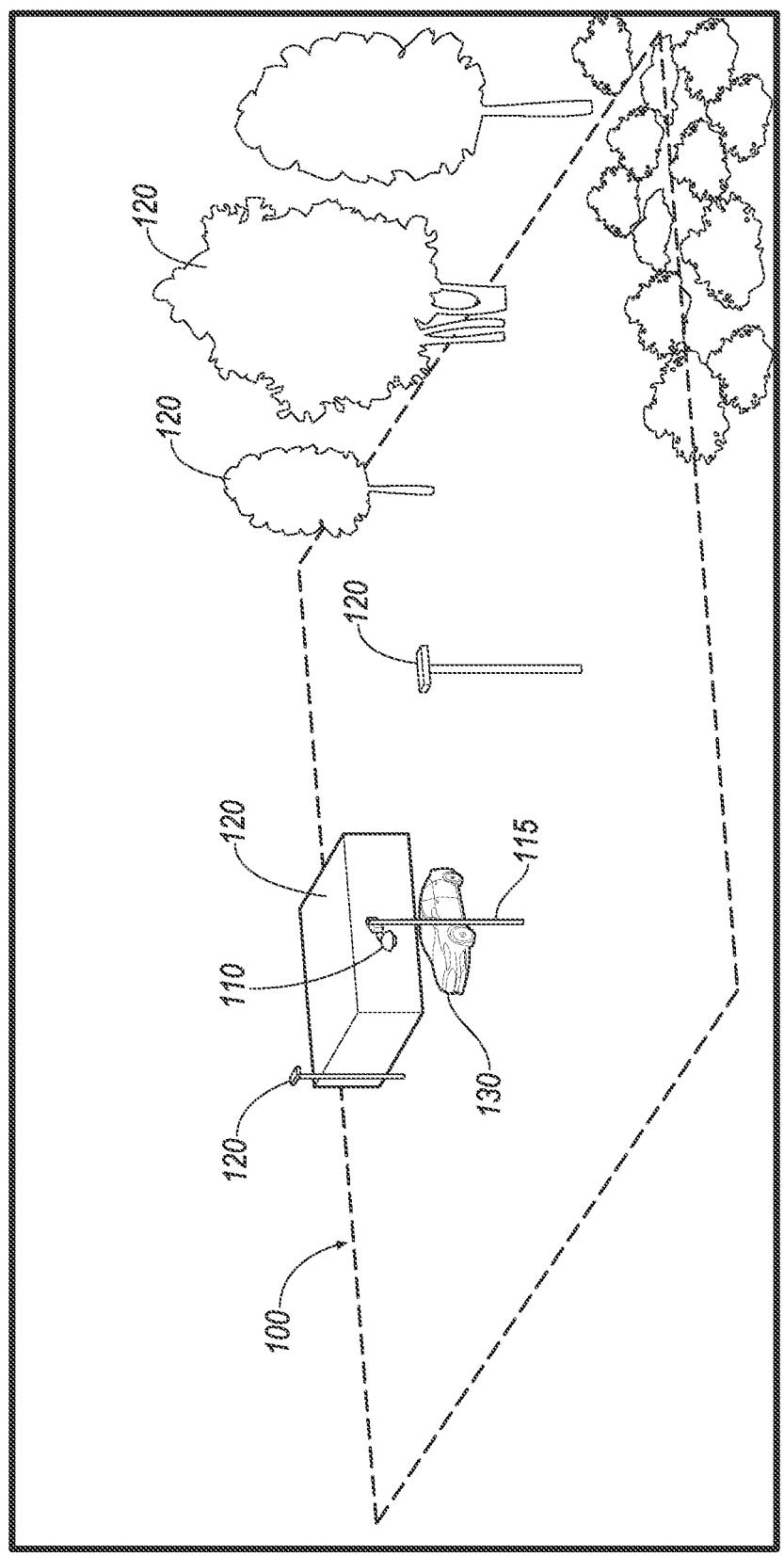
FIG. 1 is a block diagram showing a perspective view an example sensor directed toward an example geographic area.

Disclosed herein is a system comprising a Lidar sensor and a processor programmed to detect, using Lidar sensor data, a low-density area comprising a plurality of Lidar beam reflections less than a threshold, to determine dimensions of the area, and based on the detection and determination, to determine that the area represents a physical object.

Determining that the area represents the object may further comprise using map data.

The map data may include at least one of (i) map data received from a remote computer, and (ii) historic map data received from a vehicle object detection sensor.

The processor may be further programmed to detect a second object based on at least one of Lidar sensor data and map data, and upon determining that the detected low-density area is a shadow casted by the second object, to ignore the detected low-density area.

The processor may be further programmed to determine that the detected low-density area is the shadow casted by the second object based at least in part on (i) a second object shape, (ii) a second object location, (iii) a Lidar sensor location, and (iv) a Lidar sensor height.

The Lidar sensor may be mounted to an infrastructure element.

The infrastructure element may be a pole mounted to a ground surface.

The system may further comprise a vehicle computer programmed to receive data, broadcasted by the Lidar sensor, and to operate one or more vehicle actuators based at least in part on the received data.

Further disclosed herein is a system comprising a Lidar sensor, and a processor programmed to generate a two-dimensional grid map including a plurality of grid cells based on data received from the Lidar sensor, to detect, in the grid map, a low-density area comprising a plurality of grid cells with an intensity less than a threshold, to determine dimensions of the low-density area, and based on the detection and determination, to determine that the low-density area represents a physical object.

The processor may be further programmed to detect a second area, within a specified distance from the low-density area, comprising a second plurality of grid cells with an intensity exceeding a second threshold, and based on the detected low-density and second areas, to determine that the second area represents a physical object.

The processor may be further programmed to determine a plurality of volumes, wherein each volume has a bottom placed on a ground surface and a top spaced upwardly from a ground surface, wherein the bottom matches a grid cell of the grid map, and to determine an intensity of each grid cell based on a number of Lidar reflections received from points within the respective volume.

The processor may be further programmed to determine that the detected low-density area is unexpected upon failing to identify a second object that casts a shadow matching at least one of a location, dimensions, and a shape of the unexpected low-density area, and determine that the unexpected low-density area represents the physical object.

The processor may be further programmed to select an expanded area of the grid map including the low-density area, to apply a filter with a second threshold to the expanded area of the grid map, and upon identifying an occupied area within the expanded area, determine that the occupied area represents the physical object.

Determining that the low-density area represents the object further may comprise using map data.

The map data may include at least one of (i) map data received from a remote computer, and (ii) historic map data received from a vehicle object detection sensor.

The processor may be further programmed to detect a second object based on at least one of Lidar sensor data and map data, and upon determining that the detected low-density area is a shadow casted by the second object, ignore the detected low-density area.

Further disclosed herein is a system comprising means for detecting, using Lidar sensor data, a low-density area comprising a plurality of Lidar beam reflections less than a threshold, means for determining dimensions of the area, and means for determining that the area represents a physical object based on the detection and determination.

The system may further comprise means for generating map data, wherein determining that the area represents the physical object is further based on map data.

Means for detecting the low-density area may be mounted to an infrastructure element.

Determining that the low-density area represents the physical object may further comprise using map data.

System Elements

Navigation of a land vehicle, e.g., an autonomous and/or semi-autonomous vehicle, may be based on object detection data, e.g., including location, dimensions, type, etc. of objects. A vehicle computer may receive object detection data from a remote sensor such as a sensor fixed to an infrastructure element, e.g., a pole. However, the sensor may fail to detect an object with a dark color and/or a reflective surface due to a low diffusion of laser beams of the sensor by the reflective surface. This disclosure pertains to systems and methods to detect such objects which cause low diffusion and are therefore more difficult to detect. Such objects (sometimes referred to as "invisible object") can be detected based on their shadow, i.e., a lack of Lidar reflections from surfaces behind the invisible object. Non-limiting example of such a system may include a Lidar sensor and a processor that can be programmed to detect, using Lidar sensor data, a low-density area including a plurality of Lidar beam reflections less than a threshold, to determine dimensions of the area, and to determine that the area represents a physical object based on the detection and determination. Thus, a collision may be prevented by detecting the physical object which may not be detected due to low diffusion of Lidar beams.

FIG. 1 illustrates a perspective view of an example geographical area 100, e.g., a road section, an urban area, etc., including a sensor 110. According to one example, the sensor 110 may be stationary, e.g., mounted to a pole 115, non-moving objects 120, e.g., building(s), vegetation, road surface, traffic light poles, etc., and/or moving objects such as a vehicle 130. Additionally, or alternatively, an area 100 may include an intersection, a sidewalk, etc. Other types of moving objects such pedestrians, bicycles, trucks, etc. may be present in the area 100.

A geographic area 100 (or area 100), in the present context, means a two-dimensional (2D) area on the surface of the earth. Boundaries or edges of an area 100 may be defined by global positioning system (GPS) coordinates, e.g., as vertices of a triangular or rectangular area 100, a center of a circular area 100, etc. An area 100 may have any suitable dimensions and/or shape, e.g., rectangular, oval, circular, non-geometrical shape, etc. As discussed above, an area 100 may include a section of a road, an intersection, etc. An area 100 may be defined based on a detection field of view and range of the sensor 110, i.e., boundary(ies) having a predetermined distance from the sensor 110.

Figure 2:
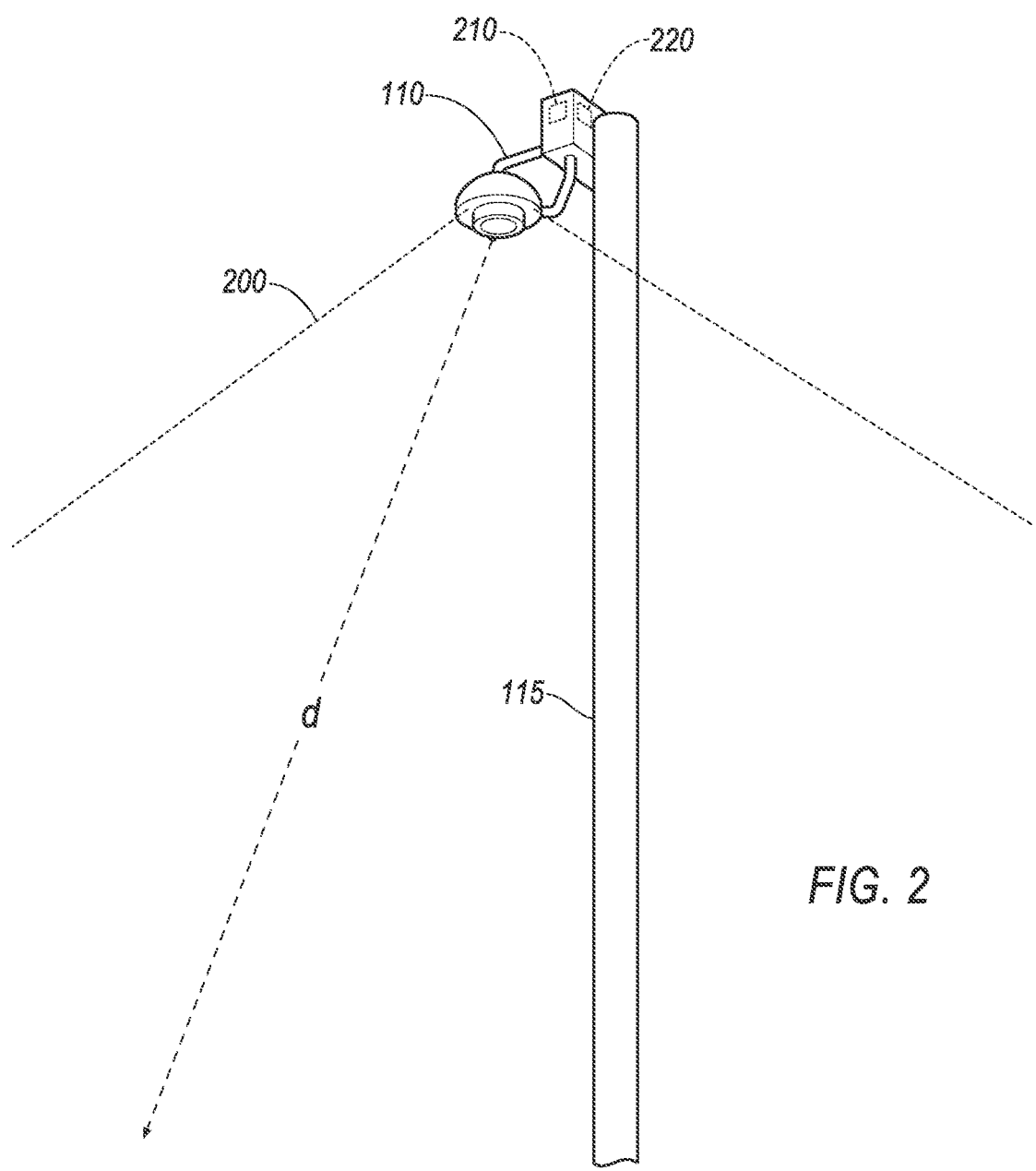
FIG. 2 shows a partial perspective view of the example sensor of FIG. 1 mounted to a pole.

With reference to FIGS. 1-2, a depth-detection system may include one or more sensor(s) 110 mounted to one or more pole(s) 115 at a side of a road, an intersection, etc., and/or to any non-moving object 120 such as a building. The pole 115 may be secured to a ground surface and/or a building. A detection range of a sensor 110, in the present context, is a distance d from the sensor 110, e.g., 200 meters, within a field of view 200 of the sensor 110 in which a non-moving object 120 and/or a vehicle 130 can be detected. A field of view 200 is an observation area of a sensor 110 bounded by a 2D or 3D angular measurement from a single point, e.g., a location of sensor 110 sensing element. Alternatively, a Lidar sensor 110 may be non-moving but not mounted to a fixed location, e.g., mounted on a truck parked at a location.

The Lidar sensor 110 may include a processor 210 and a memory 220 storing instructions to transmit Lidar data via a wired and/or wireless communication network. The memory 220 includes one or more forms of computer-readable media, and stores instructions executable by the processor 210 for performing various operations, including as disclosed herein. As discussed below, a vehicle 130 may be operated based at least in part on received data from the sensor(s) 110. The Lidar data may include coordinates of a non-moving object 120 and/or a vehicle 130, e.g., according to a 3-dimensional Cartesian coordinate system. Lidar data may further include other data pertaining to other attributes such as size, relative speed to the Lidar sensor 110 location, etc.

In one example shown in FIGS. 1-2, the Lidar sensor 110 may sweep the example area 100—e.g., sweep field of view 200 (e.g., between 0-360°) by transmitting laser beams, and receiving back reflections from objects in the area 100. The Lidar sensor 110 receives reflections of the light beams from outer surfaces of the features such as non-moving objects 120 and/or vehicle(s) 130, etc., and/or ground surface. Thus, the Lidar data may include location coordinates of points on outer surfaces of features which cause a reflection of the emitted light beams. In other words, the Lidar sensor 110 data may include 3D location coordinates of a plurality of points within the field of view 200 of the Lidar sensor 110 with reference to, e.g., a 3D Cartesian coordinate system.

Additionally, or alternatively, multiple sensors 110 collectively may collect Lidar data regarding area 100. In one example, multiple Lidar sensor 110 may be placed at a location, e.g., mounted to a pole 115, each providing a field of view 200 in a specified direction. Additionally, or alternatively, multiple Lidar sensors 110 may be located in an area 100, e.g., mounted to various non-moving objects 120, poles 115, etc. The Lidar sensors 110 may communicate with one another via a wired and/or wireless communication network. In one example, a remote computer may be programmed to receive Lidar data from multiple sensor 110 and generate Lidar data for the area 100 based on received data from multiple sensors 110, and to broadcast the Lidar data to, e.g., vehicles 130, via a wireless communication network. In yet another example, each of the Lidar sensors 110 processor 210 may be programmed to broadcast the respective Lidar data to, e.g., the area 100 or beyond.

The processor 210 may be programmed to determine a type of objects using known techniques such as semantic segmentation or the like. For example, the processor 210 may be programmed to classify an object as a non-moving object 120 or vehicle 130. Additionally, or alternatively, the processor 210 may be programmed to classify an object as a vehicle, building, pedestrian, vegetation, traffic pole, road surface, traffic sign, sidewalk, etc.

The wireless communication network, which may include a Vehicle-to-Vehicle (V-to-V) and/or a Vehicle-to-Infrastructure (V-to-I) communication network, includes one or more structures by which the Lidar sensors 110, remote computer(s), vehicle(s) 130, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

A processor 210 may be programmed to receive map data from a remote computer, e.g., an infrastructure computer. In the present context, map data includes any type of data describing location, dimensions, shape, type, etc. of objects and/or surfaces within a mapped area, e.g., the example area 100. The map data may be two-dimensional (2D) describing data on a ground surface or a three-dimensional (3D) describing data pertaining to a volume above the area 100, e.g., a volume with a bottom on the area 100 and a height. Map data may be generated based on data collected by a mapping vehicle navigating in the area 100 and collecting camera, Lidar, radar data from the area 100. For example, map data may include a point cloud that describes location of points on surfaces of objects and ground surface within a mapped area 100. Additionally, or alternatively, the processor 210 may be programmed to receive historic map data from a vehicle 130 object detection sensor 330, as discussed with reference to FIG. 3. Additionally, map data may include type of objects included in the map, e.g., road surface, building, traffic sign, pole, vegetation, etc.

In the present context, the "historic image data" (or historic map data or historic map image data) includes image data captured by a vehicle 130 prior to a time of the real-time operation of the processor 210. In one example, historic image data may be collected days, months, etc., before a current time, e.g., by a mapping vehicle. In another example, the historic map data may be collected in a same location minutes or seconds before the current time and received via vehicle-to-vehicle communications. In another example, the historic image map data may include data, e.g., image data, Lidar data, etc., collected by a vehicle 130 Lidar, camera, radar sensor 330 (see FIG. 3).

The map data typically includes data pertaining to non-moving objects 120, e.g., buildings, traffic light, traffic sign, road surface, etc. In some examples, map data may further include moving objects such as vehicles 130, pedestrians, etc. that have been present at a time of scanning the area 100 for generating the map data. Thus, such moving object data may not be useful for localization because such object data may have been accurate at a time of collecting area 100 object data by the sensor 110.

Figure 3:
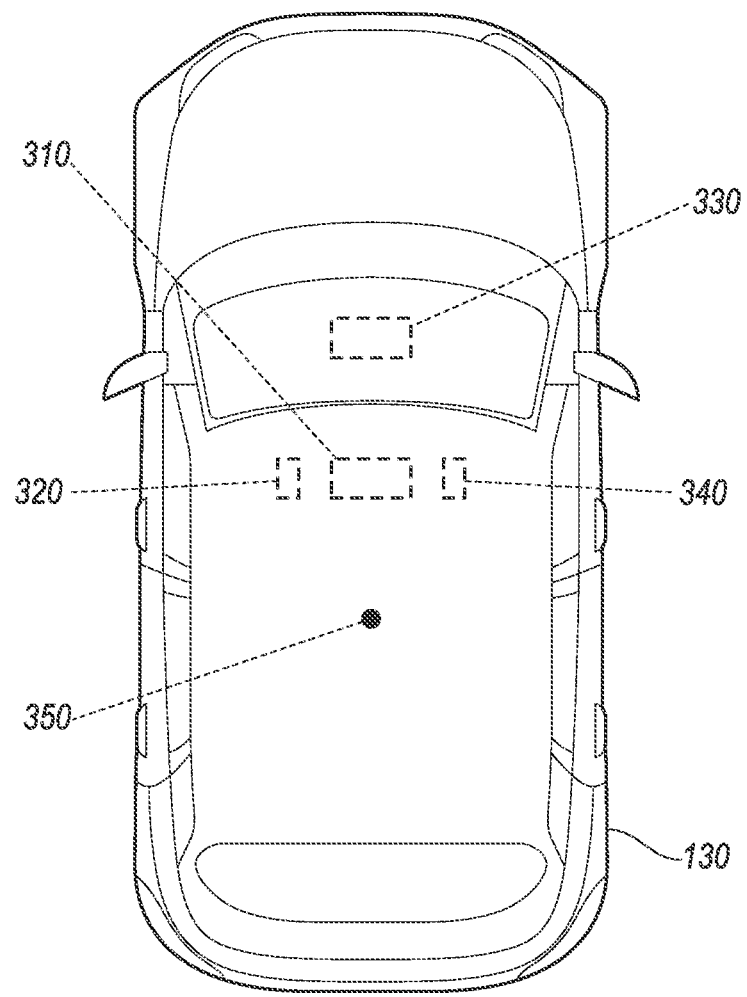
FIG. 3 is a schematic view of an example vehicle shown in FIG. 1.

Referring now to FIG. 3, an example vehicle 130 may include a computer 310, actuator(s) 320, sensors 330, human machine interface (HMI 340), and/or other components such as discussed herein below. In the illustration, the vehicle 130 is shown as a passenger vehicle; however, other suitable vehicles may be employed instead (e.g., a truck, van, and all-terrain vehicle, a drone, just to name a few). A vehicle 130 may include a reference point 350, e.g., an intersection of a vehicle 130 longitudinal and lateral axes (the axes can define respective longitudinal and lateral center lines of the vehicle 130 so that the reference point 350 may be referred to as a vehicle 130 center point). A vehicle 130 may be powered in variety of ways, e.g., including with an electric motor and/or internal combustion engine.

The computer 310 includes a processor and a memory. The memory includes one or more forms of computer-readable media, and stores instructions executable by the computer 310 for performing various operations, including as disclosed herein.

The computer 310 may operate the vehicle 130 in an autonomous, semi-autonomous, or non-autonomous mode. For purposes of this disclosure, an autonomous mode is defined as one in which each of vehicle 130 propulsion, braking, and steering are controlled by the computer 310; in a semi-autonomous mode the computer 310 controls one or two of vehicle 130 propulsion, braking, and steering; in a non-autonomous mode, a human operator controls vehicle propulsion, braking, and steering.

The computer 310 may include programming to operate one or more of vehicle brakes, propulsion (e.g., control of acceleration in the vehicle 130 by controlling one or more of an internal combustion engine, electric motor, hybrid engine, etc.), steering, climate control, interior and/or exterior lights, etc., as well as to determine whether and when the computer 310, as opposed to a human operator, is to control such operations.

The computer 310 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 310 is generally arranged for communications on a vehicle communication network such as a bus in the vehicle such as a controller area network (CAN) or the like. Via the vehicle network, the computer 310 may transmit messages to various devices in the vehicle 130 and/or receive messages from the sensors 330, actuators 320, etc.

The vehicle 130 actuators 320 may be implemented via circuits, chips, or other electronic components that can actuate various vehicle subsystems in accordance with appropriate control signals as is known. The actuators 320 may be used to control braking, acceleration, and steering of the first vehicle 130. As an example, the vehicle 130 computer 310 may output control instructions to control the actuators 320.

The vehicle 130 may include one or more sensor(s) 330, providing data encompassing at least some of an exterior of the vehicle 130, e.g., GPS sensor, camera, radar, and/or Lidar sensor.

The computer 310 may be programmed to operate the vehicle 130 based on data received from the vehicle 130 sensor(s) 330 and/or the sensor(s) 110. For example, the computer 310 may be programmed to determine location(s) a non-moving object 120 or a second vehicle 130 (not shown) relative to the vehicle 130 based on data received from the Lidar sensor(s) 110, and to operate the vehicle 130 based on the determined location(s). The vehicle 130 may communicate with the Lidar sensors 110, e.g., via a V-to-I wireless communication network.

Figure 4A:
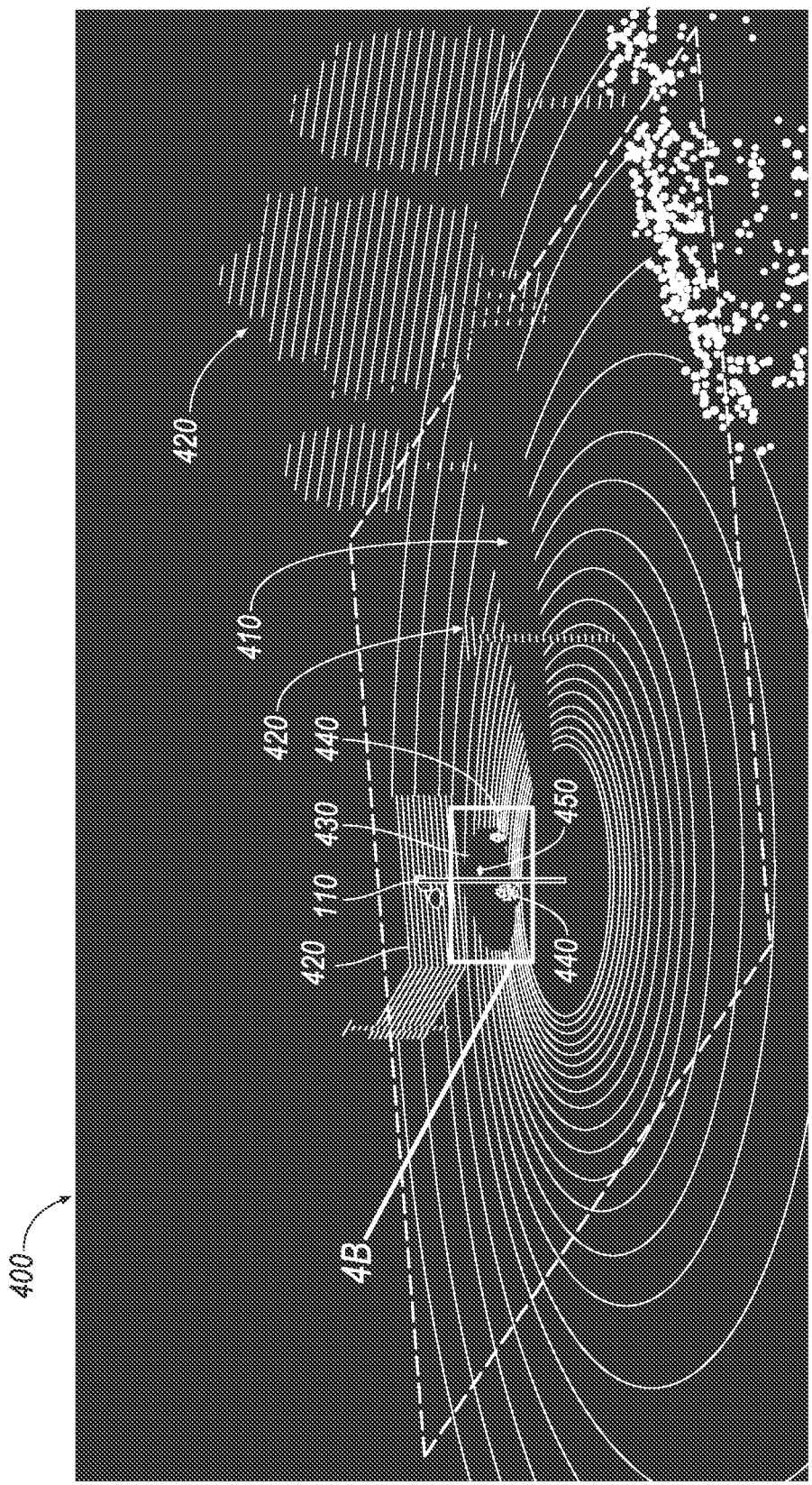
FIG. 4A shows an example representation of point cloud data received from the sensor of FIG. 1.

With reference to FIG. 4A, an example image 400 shows a graphical representation of Lidar data (or point cloud data) describing the area 100 received from the sensor 110 (not shown in FIG. 4A). Each point in the image 400 represents a reflection of laser beam received at the Lidar sensor 110 from a respective point on a surface in the area 100. The image 400 shows a 3D representation of a volume above the area 100 based on location coordinates including longitudinal, lateral, an elevation coordinates received from the Lidar sensor 110. Curved lines on the ground surface represent reflections of sweeping beams from the ground surface, e.g., indicating a flat surface such as a road surface with no object present.

With continued reference to FIG. 4A, a region 410 of the image 400 represents a blind spot from a perspective of the sensor 110 on the pole 115. For example, the pole 105 and a housing of the sensor 110 at a bottom of the sensor 110 may obstruct a viewing of the region 410. Regions 420 represent the reflections received from the objects 120, e.g., vegetation, trees, buildings, etc., of FIG. 1. A region 430 shows a location where the vehicle 130 is located. Although regions 440, 450 show reflections of wheels and side mirror of the vehicle 130, however reflections from a body of the vehicle 130 are substantially absent. In other words, reflections from the vehicle 130 body are missing which is represented as a dark area in the image 400. In the context of representing point cloud data, e.g., the image 400, "dark" means lack of received reflection points. This represents a technical challenge of detecting invisible objects such as the vehicle 130 with a highly reflective surface and a dark color. A highly reflective surface of an invisible object may not diffuse (or minimally diffuse) the laser beams of the Lidar 110 (similar to a mirror). According to one example, a highly reflective surface means having a reflectance greater than a threshold, e.g., 80%.

Figure 4B:
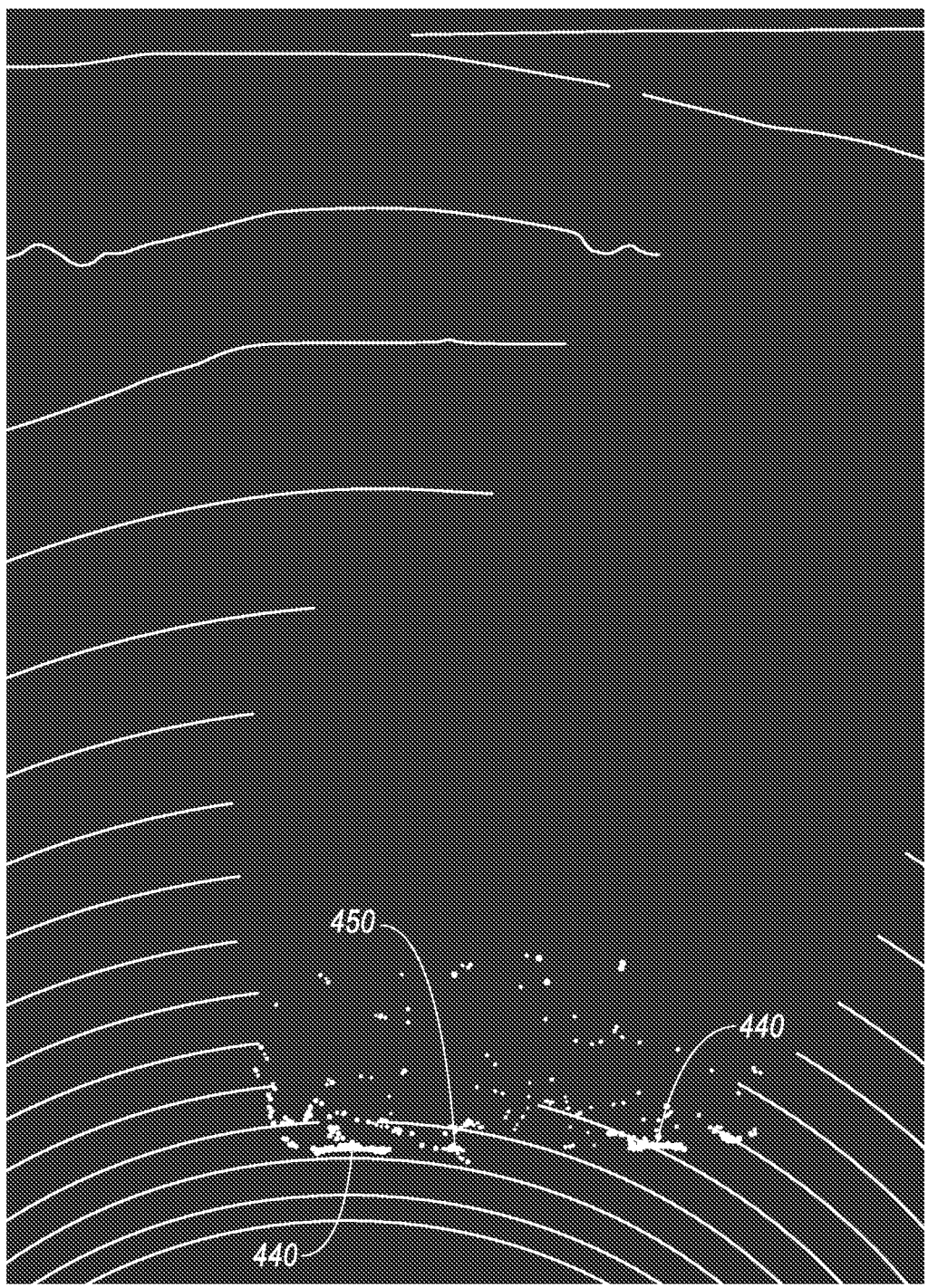
FIG. 4B shows a top view of a portion of FIG. 4A illustrating an example invisible vehicle.

FIG. 4B illustrates a portion of FIG. 4A surrounding a location of the vehicle 130. Similar to FIG. 4A, the Lidar sensor 110 receives reflections from wheels and/or side mirror, e.g., because of having diffusing surfaces, whereas the Lidar sensor 110 does not receive reflections (or receives very few reflections that are not sufficient to detect an object) from the vehicle 130.

With reference to FIGS. 4A-4B, an "invisible object" such as the vehicle 130 with highly reflective body surface and dark color may be detected based on shadows (or low-density areas, as discussed below) in the received image 400. In the present context, a "shadow" refers to a lack of laser beam reflection(s) from a surface as a result of an obstruction such as an object between the Lidar sensor 110 and the respective shadow surface.

An example system may include a Lidar sensor 110 and a processor such as the processor 210 of the Lidar sensor 110 which can be programmed to detect, using Lidar sensor 110 data, a low-density area, e.g., the region 430 comprising a plurality of Lidar beam reflections less than a threshold, to determine dimensions of the region 430, and to determine that the region 430 represents a physical object, e.g., the invisible vehicle 130, based on the detection and determination.

In the present context, "reflections less than a threshold" means a number of reflections from points in a specified volume, e.g., a volume with a height of 1 m and a rectangular bottom surface of 20×20 centimeter (cm) on the ground surface. For example, the threshold may be 20 reflections from points within a volume of 20 cm×20 cm×1 m, as discussed below with reference to equation (1) and FIG. 10.

Figure 8:
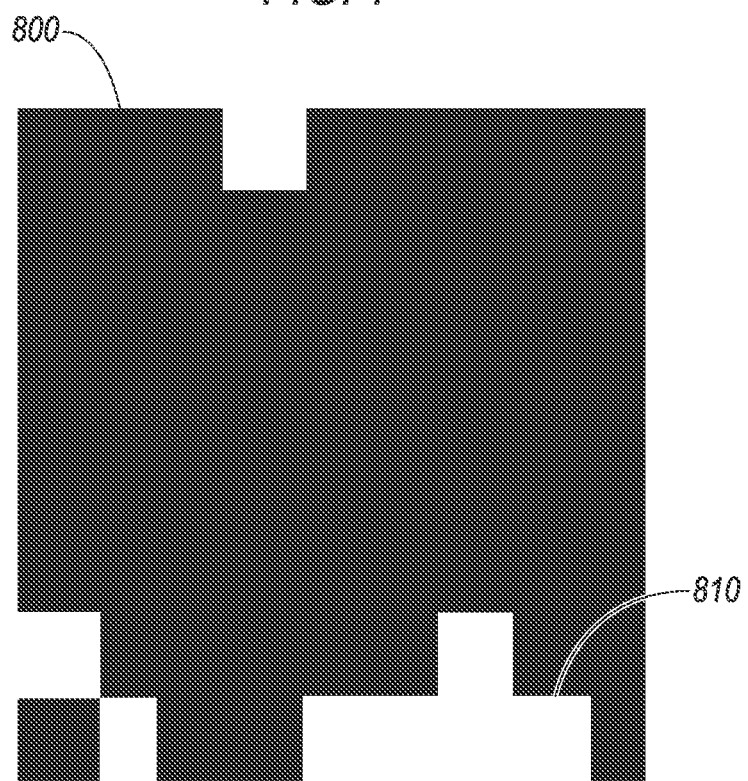
FIG. 8 shows the portion of grid map of FIG. 7 after applying a second filter with a second intensity threshold.
Figure 9A:
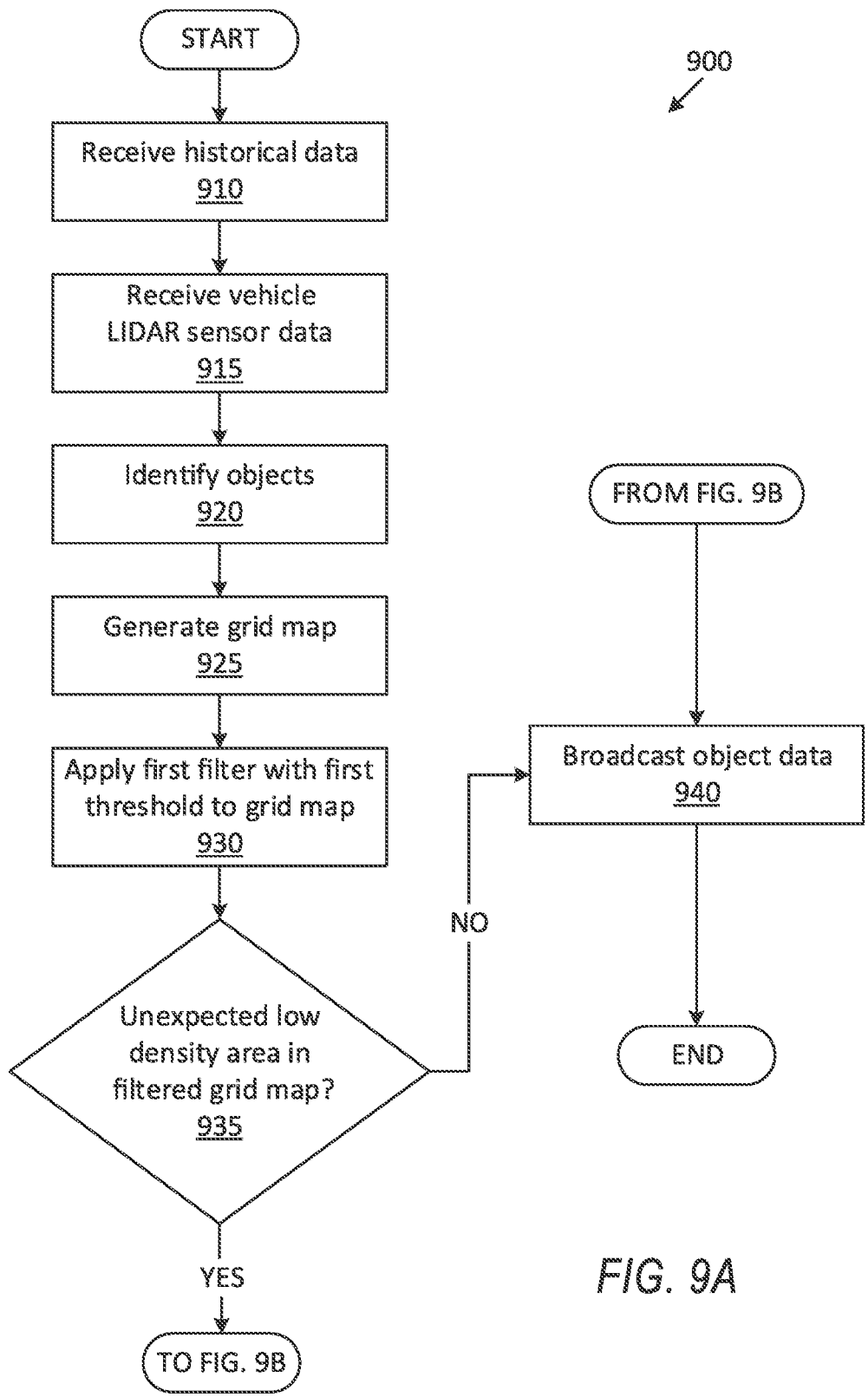
FIGS. 9A-9B are a flowchart of an exemplary process for detecting an object.
Figure 9B:
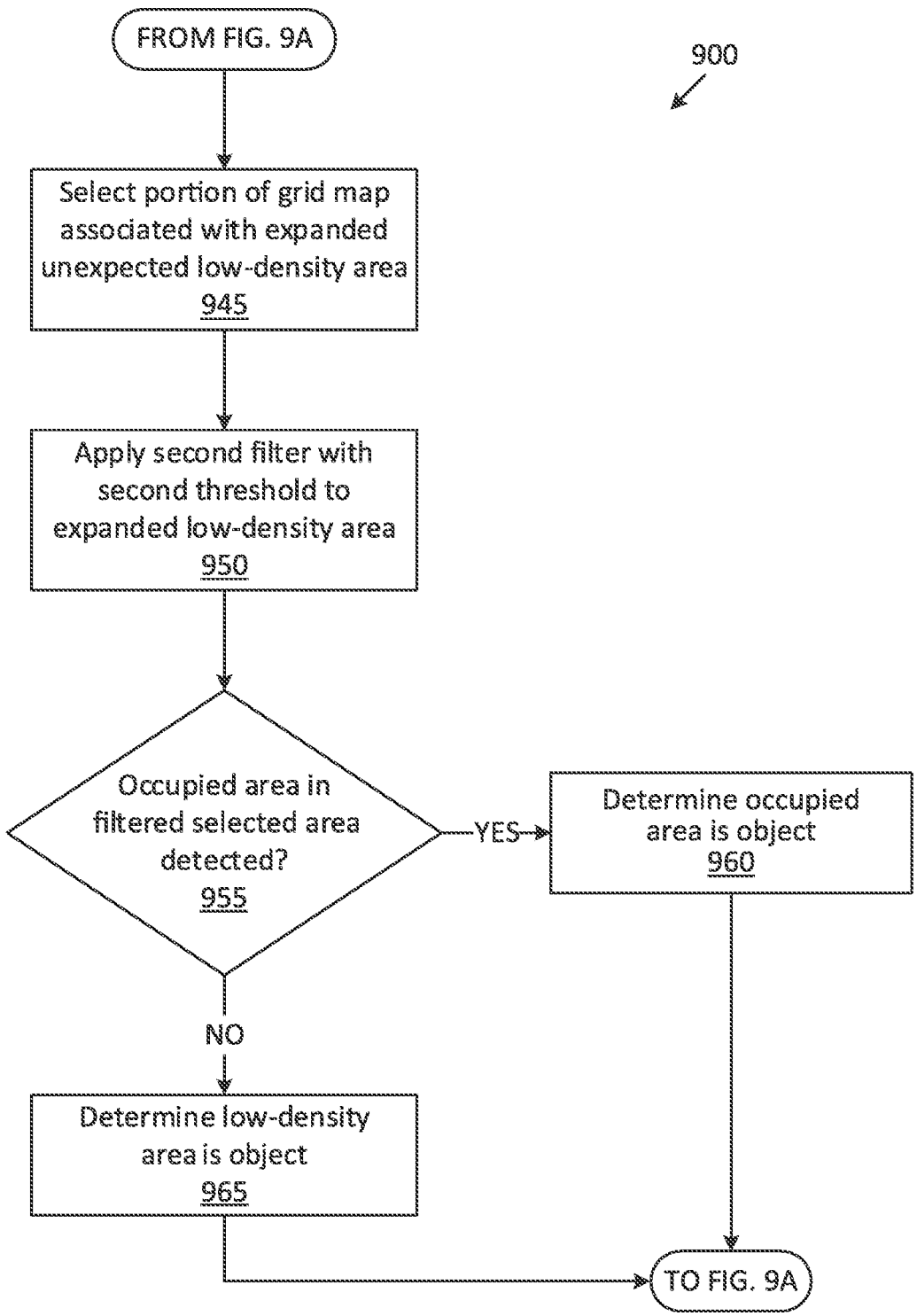

FIGS. 9A-9B illustrate an example process 900 for detecting invisible objects (such as vehicle 130 shown in FIGS. 4A-4B) and also operating vehicle 130 (e.g., the invisible vehicle 130 and/or any other vehicle 130). Blocks of the process 900 are discussed below with reference to FIGS. 5-8. In one example, the processor 210 may be programmed to execute blocks of the process 900. The process 900, as described below, is only a non-limiting example. The system and/or methods described herein is not limited to the presented sequence of executing the blocks of the process 900. Additionally, or alternatively, one or more blocks of the process 900 may be omitted in an implementation of the disclosed system and/or method.

The process 900 begins in a block 910, in which the processor 210 receives map data from a remote computer, a vehicle 130 computer 310, etc., e.g., including location, dimensions, etc. of non-moving objects 120 and/or vehicle(s) 130 in the area 100. Alternatively, the block 910 may be omitted, i.e., the processor 210 may be programmed to detect an invisible object such as the vehicle 130 without relying on map data received form a remote computer.

Next, in a block 915, the processor 210 receives vehicle 130 Lidar sensor 330 data. For example, the processor 210 may be programmed to receive Lidar sensor 330 data and/or other object detection sensor 330 (e.g., camera, radar, etc.) data from one or more vehicles 130 via a wireless communication network, e.g., a V-to-I communication network. Alternatively, the block 915 may be omitted, i.e., the processor 210 may be programmed to detect an invisible object such as the vehicle 130 without relying on object detection data received from vehicles 130.

Next, in a block 920, the processor 210 by receives Lidar point cloud data from the sensor 110, processes the point cloud data, and identifies physical objects thereby. For example, the processor 210 may be programmed to identify the non-moving object 120, and/or vehicles 130 based on reflections received from surfaces of the non-moving objects 120 and/or vehicles 130. Additionally, or alternatively, the processor 210 may be programmed to detect non-moving objects 120 and/or vehicles 130 based on received map data and/or data such as historic data received from other computers such as vehicle 130 computer 310. The processor 210 may fail to detect an invisible object such as the vehicle 130 wit highly reflective surfaces and a dark color, as discussed above.

Figure 5:
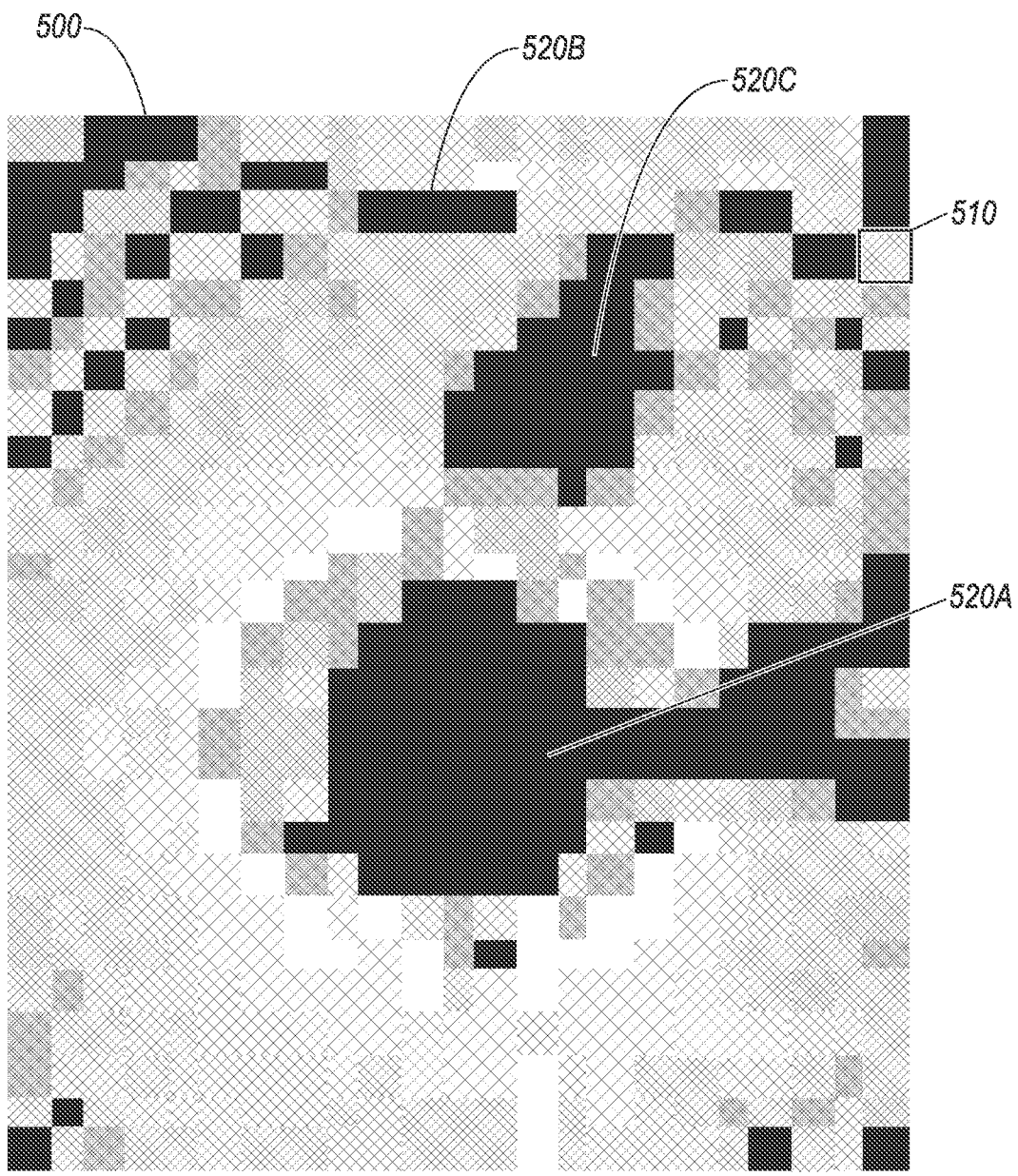
FIG. 5 shows an example grid map of the example geographic area.
Figure 6:
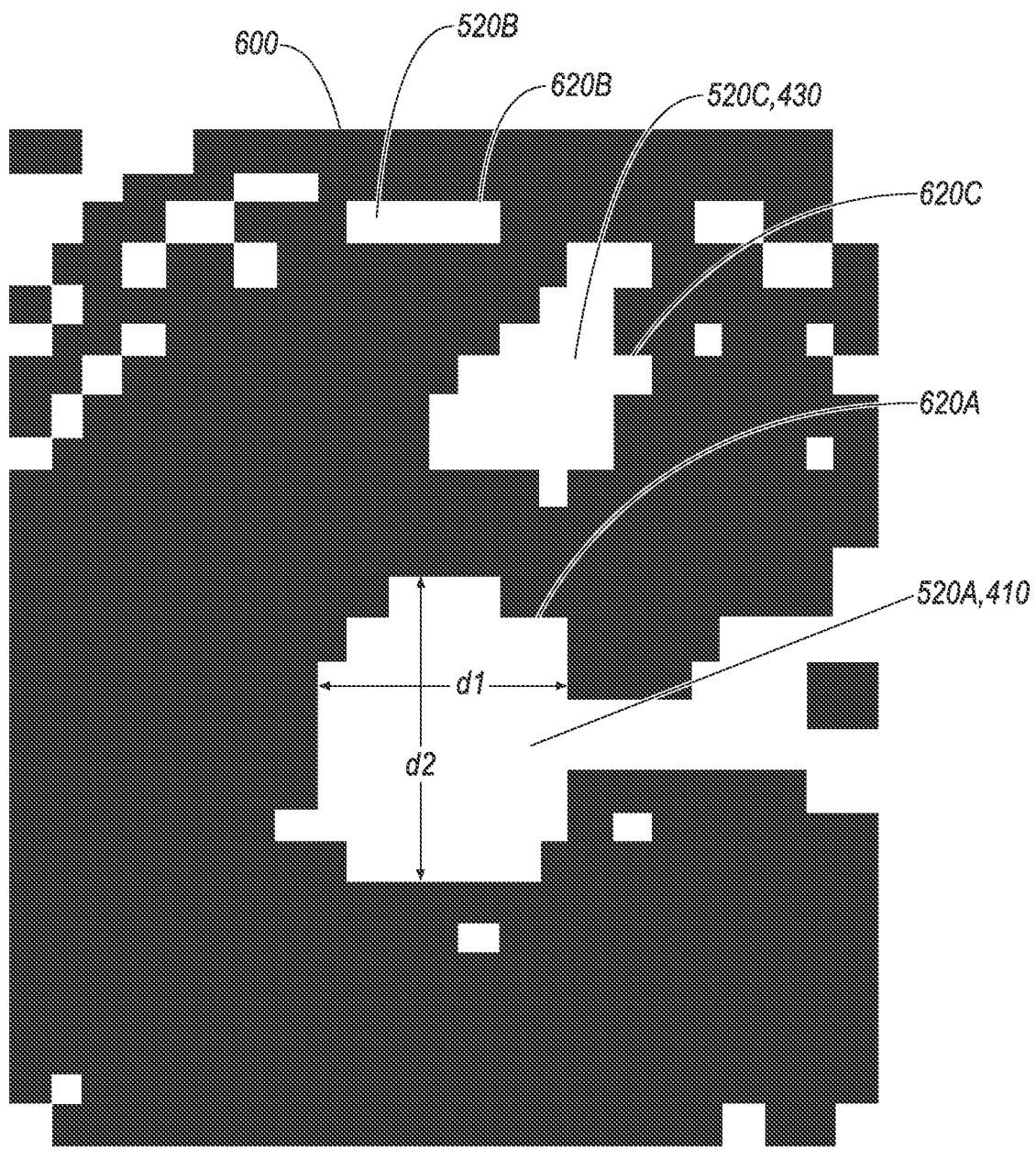
FIG. 6 shows the example grid map of FIG. 5 after applying a filter with a first intensity threshold.
Figure 7:
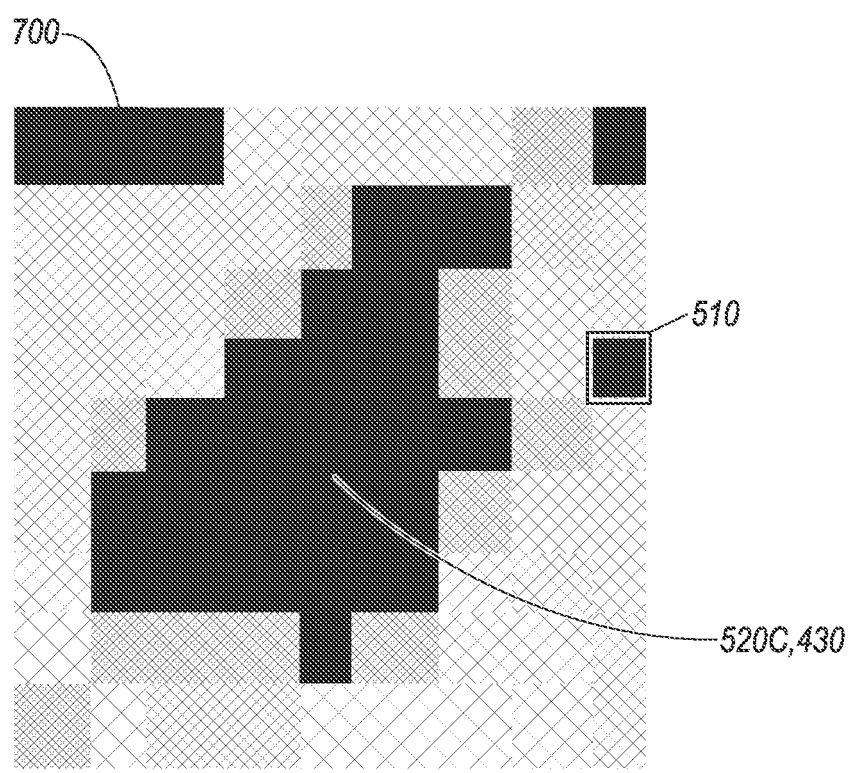
FIG. 7 shows a portion of the grid map with a low-density area.

Next, in a block 925, the processor 210 generates an intensity grid map of the area 110. FIG. 5 shows an example intensity grid map 500 (or grid map) of the area 100. For example, the processor 210 may be programmed to generate a grid map 500 including a plurality of grid cells 510 based on point cloud data received from a Lidar sensor 110.

An intensity grid map 500, as shown in FIG. 5, is a map representing an area 100 in a two-dimensional (2D) plane. Thus, the grid map 500 may be a projection of points of 3D point cloud onto the 2D ground surface, as discussed below with reference to equation (1). The grid map 500 includes multiple cells 510, e.g., forming a grid of same-size cells 510; each cell includes information regarding an average intensity for the respective cell 510 of the map 500. A cell of the intensity map 500 may represent a portion of the ground surface. In one example, dimensions of cells 510 may be associated with a 20×20 centimeter (cm) square on the ground surface. An "intensity" of a cell may be specified by a numeric value, e.g., in percentage, a number from 0 (zero) to 255, etc., representing a physical measurement proportionally related to a number of reflection received from an area encompassed by the respective cell 510. A brightness of a cell 510, as shown in FIG. 5, may be correlated with a respective intensity thereof. In one example, an intensity of 0 (zero) % specifies a dark cell 510 and an intensity of 100% specifies a bright cell 510 on the grid map 500.

In one example, the processor 210 may be programmed to determine an intensity of a cell 510 based on a number of reflections received from within boundaries of the respective cell 510 on the ground surface. In another example, the processor 210 may be programmed to determine an intensity of a cell 510 based on the reflection points within a volume above the grid cell, e.g., based on equation (1). A reflection point is a point from which a reflection is received. Parameters a, b represent dimensions of a grid cell, e.g., 20 cm, 20 cm, and the parameter c represents a height of the volume, e.g., 5 meters (m). $i_{X,Y}$ is an intensity of a grid cell with center-point location coordinates X, Y with reference to a coordinate system such as the GPS reference point. With reference to equation (1), an intensity $i_{X,Y}$ of coordinates X, Y on the grid map 500 includes reflections received from all points with z coordinates 0 (zero) to c. Thus, equation (1) shows an example projection from a 3D coordinates system to a 2D coordinates system, e.g., with a reference point such as GPS reference point, a geometrical center point of the grid map 500, etc. For example, a 100×100 grid map 500 having cells 510 with dimensions 1×1 (m) may correspond to an area with dimensions 100×100 (m). Additionally, or alternatively, a grid map 500 may be generated based on an example algorithm shown in FIG. 10.

$$i_{X,Y} = \Sigma_{X-a/2}^{X+a/2} \Sigma_{Y-b/2}^{Y+b/2} \Sigma_0^c r(x,y,z) \quad (1)$$

r(x, y, z) represents a reflection at location coordinates x, y, z with respect to a 3D coordinate system. In one example, the processor 210 may determine a value 0 (zero) for reflection value at coordinates x, y, z upon determining that no reflection is received from the point at the location coordinates x, y, z and may determine 1 (one) when a reflection is received. In one example, the processor 210 may be programmed to determine a value between 0 and 100 for the intensity $i_{X,Y}$. The processor 210 may be programmed to determine a value 100 when equation (1) returns a number greater than 100 (i.e., more than 100 reflections received) and/or, with reference to FIG. 10, a number of points in a cell is greater than a threshold, e.g., 100.

Additionally, or alternatively, the processor 210 may be programmed to determine an intensity $i_{X,Y}$ further based on a height of a reflection point, because a reflection point with a high elevation, e.g., exceeding 50 cm from the ground surface, may indicate a presence of a non-moving object 120 and/or vehicle 130 whereas a reflection at a low height, e.g., less than 10 cm, may indicate reflections from the ground surface. Thus, the processor 210 may be programmed to take the elevation of reflection points into account.

Next, in a block 930, to identify low-density areas 520A, 520B, 520C of the grid map 500, the processor 210 applies a first filter with a first threshold $th_1$ to the grid map 500. In one example, with reference to FIG. 6, the processor 210 may be programmed to apply the first filter based on equation (2) on the grid map 500, and to generate a second grid map 600.

$$O_{X,Y} = \begin{cases} 0 & i_{X,Y} \geq th_1 \\ 1 & i_{X,Y} < th_1 \end{cases} \quad (2)$$

The processor 210 may be programmed to detect a low-density area 520A, 520B, 520C in the grid map 500 including a plurality of grid cells 510 with an intensity $i_{X,Y}$ less than a threshold, e.g., 20. A low-density area 520A, 520B, 520C, in the present context, is an area of the grid map 500, i.e., one or more cells 510, in which a number of laser reflections received at the Lidar sensor 110 is less than a threshold, e.g., an intensity $i_{X,Y}$ less than a threshold, e.g., 20.

The processor 210 may be programmed, based on equation (2), to determine a low-density area 520A, 520B, 520C by identifying grid cell(s) in the grid map 600 with an occupancy value $O_{X,Y}$ of 1.

The processor 210 may be programmed to determine dimensions of the identified low-density areas 520A, 520B, 520C. For example, the processor 210 may be programmed to determine longitudinal and lateral dimensions $d_1$, $d_2$ of the low-density area 520A. Additionally, or alternatively, the processor 210 may be programmed to determine a shape, e.g., circle, triangle, rectangle, non-geometrical, etc., of the identified low-density area 520A, 520B, 520C. The processor 210 may be programmed to determine a perimeter 620A, 620B, 620C of a low-density area 520A, 520B, 520C. A perimeter 620A, 620B, 620C is a line surrounding a low-density area 520A, 520B, 520C. For example, the dimensions $d_1$, $d_2$ may be dimensions of area 520C that is result of the physical object (vehicle 130) casting a shadow on the ground surface (i.e., lacking a height of the object or elevation of points on the object 130 exterior surface).

Next, in a decision block 935, the processor 210 determines whether an unexpected low-density area 520A, 520B, 520C is detected, i.e., whether at least one of any detected low-density areas 520A, 520B, 520C is unexpected. In the present context, an "unexpected" low-density area is an area, for which the processor 210 cannot identify an object which can cast a shadow matching the respective low-density area.

In one example, a low-density area 520A may result from a known obstruction, e.g., the pole 105, a housing of the Lidar sensor 110, etc., of the laser beams of the Lidar sensor 110 (corresponding to the region 410 of the image 400). In another example, a low-density area 520B may be resulted from a non-moving object 120, e.g., a building, that is detected by the processor 210 based on the Lidar sensor 110 data and/or map data, i.e., the example low-density areas 520A, 520B are expected.

The processor 210 may be programmed to determine that the detected low-density area 520A, 520B is a shadow casted by a second object (e.g., the pole 115, the housing of the Lidar sensor 110, the building non-moving 120) based at least in part on (i) a second object shape, (ii) a second object location, (iii) a Lidar sensor location, and (iv) a Lidar sensor height, e.g., using known geometrical projection techniques. For example, the processor 210 may be programmed to detect a second object, e.g., the pole 115 based on map data, and to ignore the detected low-density area 510A based on the detected pole 115. The map data may include data including location, dimensions, shape, etc. of the pole 115. Thus, the processor 210 may be programmed to estimate an expected shape, dimensions, etc. of a shadow of the pole 115 and/or housing of the sensor 110 and to determine that the low-density area 520A is a shadow casted by the pole 115 and/or the housing of the sensor 110.

In yet another example, a low-density area 520C may be resulted from an invisible object such as the vehicle 130 (corresponding to the region 430 of the image 400). Thus, the low-density area 520C may be unexpected, e.g., when the processor 210 fails to identify a second object that casts a shadow matching location, dimensions $d_1$, $d_2$, and/or shape of the unexpected low-density area 520C. In the present context, "matching dimensions" may mean having a difference less than a specified threshold, e.g., 10%. Further, matching shape may mean having a same type of shape, e.g., rectangular, trapezoidal, circular, etc. "Matching location" may mean a distance between location, e.g., a center thereof, of the shadow and the low-density area is less than a specified threshold, e.g., 1 meter. If the processor 210 identifies an unexpected low-density area 520C, then the process 900 proceeds to a block 945 (see FIG. 9B); otherwise the process 900 proceeds to a block 940.

In the block 940, the processor 210 broadcasts the object data. For example, the processor 210 may be programmed to broadcast the object data including objects data, identified in the block 920 and/or the blocks 960, 965, to a remote computer, a vehicle 130 computer 310, other sensors 110 processor 210, etc. In one example, a vehicle 130 computer 310 may operate the vehicle 130 based at least in part on the broadcast object data. Following the block 940, the process 900 ends, or alternatively returns to the block 910, although not shown in FIG. 9A.

Now turning to FIG. 9B, in the block 945 (which proceeds from decision block 935 when processor 210 determines an unexpected low-density area), the processor 210 selects, from the grid map 500, an expanded unexpected low-density area 700 (see FIG. 7) associated with an unexpected low-density area such as the area 520C. In the present context, "expanded" means having dimensions greater than dimensions of the unexpected low-density area 520C, e.g., by adding a specified numeric value e, e.g., 3 grid cells 510, in a direction outwardly from a perimeter 620C of the low-density area 520C. For example, an expanded area 700 may have dimension of $d_1+6$, $d_2+6$ ($d_1$, $d_2$ are dimensions of the low-density area 520C specified in number of grid cells 510).

Next, in a block 950, the processor 210 applies a second filter with a second threshold $th_2$, e.g., 50, to the expanded low-density area 700, and generates a filtered expanded area 800. For example, the processor 210 may be programmed to apply a second filter based on example equation (3) with the second threshold $th_2$. The processor 210 may associate an occupancy value c to each of the grids 510 of the filtered expanded area 800.

$$O_{X,Y} = \begin{cases} 1 & i_{X,Y} \geq th_2 \\ 0 & i_{X,Y} < th_2 \end{cases} \quad (3)$$

Next, in a decision block 955, with further reference to FIG. 8, the processor 210 determines whether there is an occupied area 810 (e.g., physical objects such as vehicle 130 wheels or side mirror which may be visible in contrast to the dark reflective body of the vehicle 130) in the filtered expanded area 800. "Occupied," in the present context, means having an occupancy value $O_{X,Y}$ of 1. In other words, "occupied" is an indication of a presence of an object in the respective grid cell(s) 510. For example, with reference to FIG. 8, the processor 210 may identify the occupied areas 810 in the filtered expanded area 800 which have an occupancy value $O_{X,Y}$ of 1. For example, the occupied area 810 of FIG. 8 may correspond with regions 440, 450 of FIG. 4 (reflections received from wheels and side mirror of the invisible vehicle 130). If the processor 210 determines an occupied area 810 in the filtered expanded area 800, then the process 900 proceeds to a block 960; otherwise the process 900 proceeds to a block 965.

In the block 960, the processor 210 determines that the occupied area 810 is a physical object. For example, the processor 210 may determine the area 810 of FIG. 8 including location of wheels and side mirror of the vehicle 130 as a physical object. In one example, the processor 210 may be programmed to determine a bounding box, e.g., a perimeter line, around the area 810 and determine a physical object in the respective location. In other words, the processor 210 may be programmed to update any object data, determined in the block 920, to include location and/or dimensions $d_1$, $d_2$ of the area 810 representing a physical object.

Here should be noted that the grid maps 500, 600, 700, 800 are 2D maps, whereas physical object, e.g., the invisible vehicle 130, are 3D, i.e., point on a physical object surface have an elevation from the ground surface. In one example, the processor 210 may be programmed to determine dimensions $d_1$, $d_2$ which may be dimensions of a shadow area casted by the physical object (vehicle 130) on the ground surface, i.e., lacking a height of the object or elevation of points on the object 130 exterior surface. That may be sufficient for a vehicle 130 computer 310 to prevent a collision with the invisible object, e.g., the vehicle 130.

Additionally, or alternatively, the processor 210 may estimate a height of the object based on intensity of grid cells 510 associated with the area 810. As discussed above with reference to equation (1), an intensity $i_{X,Y}$ of a grid cell 510 may be determined based on reflections received in a volume above the ground surface located at the location coordinates X, Y. In one example, the processor 210 may be programmed to determine a height of a physical object based on a maximum intensity $i_{X,Y}$ of the regions 440, 450.

Here is understood that the location and/or dimensions of the bounding box around the area 810 may not accurately reflect the location of a vehicle 130 reference point 350 and/or vehicle 130 dimensions. However, identifying a physical object at the location of area 810 may be sufficient for navigating other vehicles 130, e.g., preventing a collision with the invisible vehicle 130. Following the block 960, the process 900 returns to the block 940 (see FIG. 9A). In other words, in this example, the processor 210 may determine that the area 810 represents the physical object. Additionally, or alternatively, the processor 210 may be programmed to determine that the area 810 and the area 520C represent the physical object.

In the block 965, the processor 210 determines that the unexpected low-density area 520C is a physical object. The processor 210 may be programmed to determine that the low-density area 520C (associated with the region 430 of FIG. 4) represents a physical object, e.g., an invisible vehicle 130. The processor 210 may be programmed to determine the location and/or dimensions $d_1$, $d_2$ of the physical invisible object to be same as the location and/or dimensions of the unexpected low-density area 520C.

In one example, the processor 210 may be programmed to determine a bounding box (e.g., the perimeter 620C) around of the area 520C and to determine a physical object in the respective location. In other words, the processor 210 may be programmed to update any object data, determined in the block 920, to include location and/or dimensions of the area 520C representing a physical object. Following the block 965, the process 900 proceeds to the block 940 (see FIG. 9A). As discussed with reference to the block 960, the area 520C is a 2D surface. The processor 210 may be programmed to identify a physical object, e.g., the vehicle 130, with a predetermined height, e.g., 1 m, and a bottom dimensions same as the dimensions of the area 520C.

Figure 10:
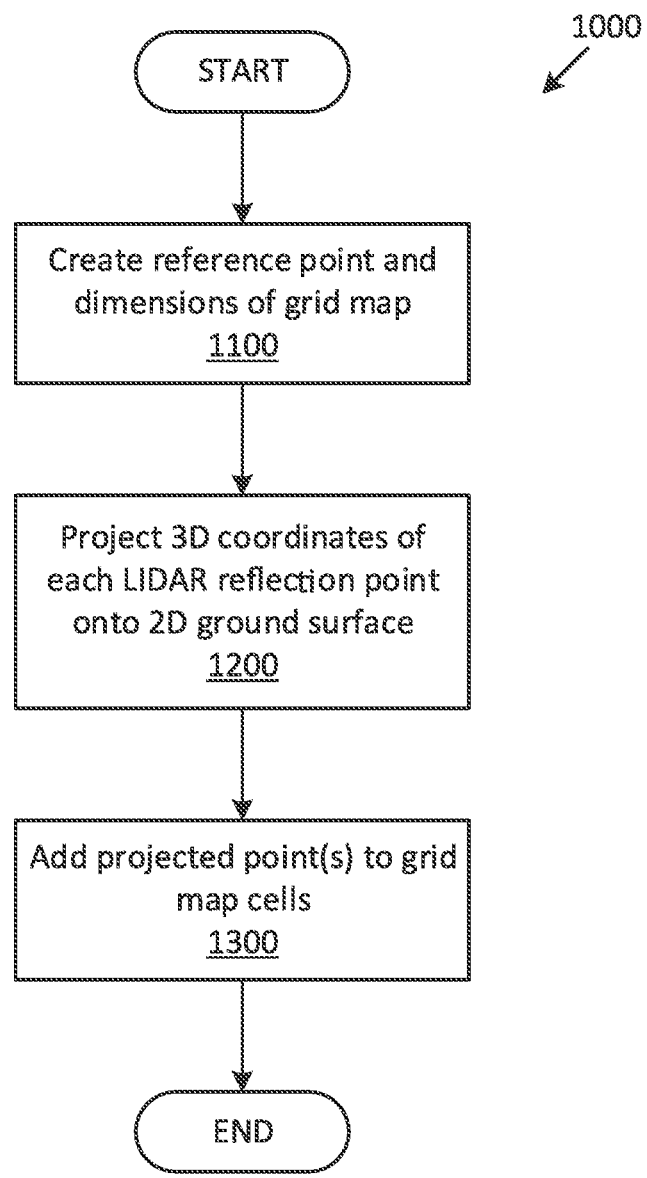
FIG. 10 is a flowchart pf an exemplary process for generating a grid map.

FIG. 10 illustrates an example process 1000 for generating a two-dimensional grid map 500 on a ground surface. Blocks of the process 1000 are discussed below with reference to FIGS. 5-8. In one example, the processor 210 may be programmed to execute blocks of the process 1000. The process 1000, as described below, is only a non-limiting example. The system and/or methods described herein is not limited to the presented sequence of executing the blocks of the process 1000. Additionally, or alternatively, one or more blocks of the process 1000 may be omitted in an implementation of the disclosed system and/or method.

The process 1000 begins in a block 1100, in which the processor 210 defines a 2D grid map 500 having dimensions M×N, e.g., 100×100. Each cell 510 may have specified dimensions W×L meters(m), e.g., 1×2 m. The processor 210 may be programmed to determine a referenced point, e.g., a center point of the grid map 500 having a lateral coordinate M/2×W and a longitudinal coordinate N/2×L.

Next, in a block 1200, the processor 210 projects each reflection point X, Y, Z from the 3D LIDAR points onto a point X, Y on the 2D ground surface. Here should be noted that each of the points from 3D LIDAR data is projected onto the 2D ground surface, i.e., multiple projected points at a given location coordinate X, Y on the ground surface may exist as a result of mapping a first 3D point X, Y, $Z_1$ and a second point X, Y, $Z_2$ onto the 2D coordinate X, Y.

Next, in a block 1300, the processor 210 adds each of the projected points to a cell 510 with coordinates x, y of the grid map 500. The processor 210 may be programmed to identify the coordinates x, y of the cell 510 based on equations (4)-(5). In the present context, a floor function takes a real number, e.g., X/W as input and returns the greatest integer less than or equal to the input real number.

$$x = \text{floor}\left(\frac{X}{W}\right) \quad (4)$$

$$y = \text{floor}\left(\frac{Y}{L}\right) \quad (5)$$

Thus, the processor 210 may be programmed to add a projected point to a cell 510 with coordinates x, y. As discussed above, there may be multiple projected points added to a cell 510 with coordinates x, y. Additionally, the processor 210 to determine adjusted coordinates x', y' based on the coordinates x, y and the reference point of the grid map 500. In other words, the reference point of 2D grid map 500 may differ from reference point of 3D LIDAR data. Thus, the processor 210 may be programmed to determine cell 510 coordinates x', y' by mapping the coordinates x, y based on the reference point of the grid map 500. Following the block 1300, the process 1000 ends, or alternatively returns to the block 1100, although not shown in FIG. 10.

Thus, there has been described an object detection system that comprises a computer and a depth detection device. According to one example, the device provides computer point-cloud data, and the computer is programmed to execute a process to detect invisible objects. A vehicle computer may then operate the vehicle based on data describing location and/or dimensions of an invisible object.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
a Lidar sensor; and
a processor programmed to:
generate a two-dimensional grid map including a plurality of grid cells based on data received from the Lidar sensor;
detect, in the two-dimensional grid map, a low-density area comprising a plurality of grid cells with an intensity less than a threshold;
determine dimensions of the low-density area;
determine that the detected low-density area is unexpected upon failing to identify a second object that casts a shadow matching at least one of a location, the dimensions, and a shape of the unexpected low-density area;
based on the detected low-density area and the determined dimensions of the low-density area, determine that the unexpected low-density area represents a physical object;
select an expanded area of the two-dimensional grid map including the low-density area;
apply a filter with a second threshold to the expanded area of the two-dimensional grid map;
upon identifying an occupied area within the expanded area, determine that the occupied area represents the physical object;
detect a second object based on at least one of Lidar sensor data and map data, and
upon determining that the detected low-density area is a shadow cast by the second object, ignore the detected low-density area.

2. The system of claim 1, wherein the processor is further programmed to:

detect a second area, within a specified distance from the low-density area, comprising a second plurality of grid cells with an intensity exceeding a second threshold; and based on the detected low-density area and the second area, determine that the second area represents a physical object.

3. The system of claim 1, wherein the processor is further programmed to:

determine a plurality of volumes, wherein each volume has a bottom placed on a ground surface and a top spaced upwardly from a ground surface; wherein the bottom matches a grid cell of the two-dimensional grid map; and determine an intensity of each grid cell, matching a bottom of a volume, based on a number of Lidar reflections received from points within the respective volume.

4. The system of claim 1, wherein determining that the low-density area represents the physical object further comprises using map data.

5. The system of claim 4, wherein the map data include at least one of (i) map data received from a remote computer, and (ii) historic map data received from a vehicle object detection sensor.

6. A method, comprising:

generating a two-dimensional grid map including a plurality of grid cells based on data received from a Lidar sensor;

detecting, in the two-dimensional grid map, a low-density area comprising a plurality of grid cells with an intensity less than a threshold;

determining dimensions of the low-density area;

determining that the detected low-density area is unexpected upon failing to identify a second object that casts a shadow matching at least one of a location, the dimensions, and a shape of the unexpected low-density area;

based on the detected low-density area and the determined dimensions of the low-density area, determining that the unexpected low-density area represents a physical object;

selecting an expanded area of the two-dimensional grid map including the low-density area;

applying a filter with a second threshold to the expanded area of the two-dimensional grid map;

upon identifying an occupied area within the expanded area, determining that the occupied area represents the physical object;

detecting a second object based on at least one of Lidar sensor data and map data, and upon determining that the detected low-density area is a shadow cast by the second object, ignoring the detected low-density area.

7. The method of claim 6, further comprising:

detecting a second area, within a specified distance from the low-density area, comprising a second plurality of grid cells with an intensity exceeding a second threshold; and based on the detected low-density area and the second area, determining that the second area represents a physical object.

8. The method of claim 6, further comprising:

determining a plurality of volumes, wherein each volume has a bottom placed on a ground surface and a top spaced upwardly from a ground surface; wherein the bottom matches a grid cell of the two-dimensional grid map; and determining an intensity of each grid cell, matching a bottom of a volume, based on a number of Lidar reflections received from points within the respective volume.

9. The method of claim 6, wherein determining that the low-density area represents the physical object further comprises using map data.

10. The method of claim 9, wherein the map data include at least one of (i) map data received from a remote computer, and (ii) historic map data received from a vehicle object detection sensor.

* * * * *